United States Patent [19]
Ahmad et al.

[11] Patent Number: 6,005,564
[45] Date of Patent: *Dec. 21, 1999

[54] DISPLAY PAUSE WITH ELASTIC PLAYBACK

[75] Inventors: Subutai Ahmad; Neal A. Bhadkamkar, both of Palo Alto; Steve B. Cousins, Mountain View; Paul A. Freiberger, San Mateo, all of Calif.; Brygg A. Ullmer, Cambridge, Mass.

[73] Assignee: Interval Research Corporation, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/761,117

[22] Filed: Dec. 5, 1996

[51] Int. Cl.$^6$ .................................................. G06T 13/00
[52] U.S. Cl. ................................ 345/327; 386/68; 386/69
[58] Field of Search ..................................... 345/302, 327, 345/328, 185, 115, 202, 203; 386/6, 46, 68, 69

[56] References Cited

U.S. PATENT DOCUMENTS

| | | | |
|---|---|---|---|
| 5,241,428 | 8/1993 | Goldwasser et al. | 360/7 |
| 5,329,320 | 7/1994 | Yifrach | 386/104 |
| 5,438,423 | 8/1995 | Lynch et al. | 386/109 |
| 5,555,463 | 9/1996 | Staron | 348/560 |
| 5,692,213 | 11/1997 | Goldberg et al. | 345/329 |

FOREIGN PATENT DOCUMENTS

| | | |
|---|---|---|
| 0713334 | 5/1996 | European Pat. Off. . |
| 4408131 | 7/1995 | Germany . |

*Primary Examiner*—Matthew Luu
*Attorney, Agent, or Firm*—David R. Graham

[57] ABSTRACT

The invention enables the display of an image to be paused, then, at the end of the pause, resumed at an accelerated rate until a time at which the content of the display corresponds to the content that would have been displayed had the image been displayed at the normal display rate without the pause, at which time display of the image at the normal display rate resumes. The invention can be used with display systems that display pre-recorded images (such as are found on video or audio cassettes, or video or audio compact discs, for example) or with display systems that display images based upon display data that is only momentarily available to the display system (such as occurs in the display of television or radio broadcasts). The invention can be used with either analog or digital display systems. Further, the invention can be used with any type of image display, such as, for example, audio displays, video displays or audiovisual displays. The invention enables a great deal of flexibility in observing the display of an image, allowing a user to pause and resume the display as desired, without having to spend more time to view the displayed image than would otherwise be the case, and without missing any part of the displayed image.

20 Claims, 4 Drawing Sheets

DISPLAY PAUSE WITH ELASTIC PLAYBACK

BACKGROUND OF THE INVENTION

1. Field of the Invention

This invention relates to the display of an image or images (such as an audio image, a video image, or an audiovisual image) over a period of time and, in particular, to systems and methods for pausing an image display, then resuming the image display in a manner that maintains the continuity of the image display while reducing or eliminating additional time required to finish viewing the entire image display beyond the time that would have been required without the pause.

2. Related Art

During standard operation in many display environments, one or more images are displayed over a period of time automatically, independent of action by an observer of the displayed images. (Herein, "image" can include any sensory stimulus, such as, for example, video images and audio images.) Typically, the image display changes over time, but this need not necessarily be the case. The display of an audiovisual program on a television, an audio program on a radio, an audio recording on an audio cassette or compact disc, or an audiovisual recording on a video cassette or compact disc are just a few examples of the display of a time-varying image or images over a period of time. An image generated from monitoring a "site" (including physical sites and virtual sites, the latter including aural, graphical and textual "sites") is an example of an image generated over a period of time that may not vary over the period of time.

It is desirable for an observer of such a time-varying, automatically displayed image to be able to pause the display of the image. Previously, this has been done by halting the display when the observer supplies an appropriate instruction, then beginning the display again, at the point at which the display was halted, when the observer supplies another appropriate instruction.

For pre-recorded images (e.g., the audio and/or video on a video cassette or a video compact disc, or the audio on an audio cassette tape or an audio compact disc), the implementation of such pausing is straightforward, since all of the display data comprising the complete image is already stored on a storage medium and can be accessed as desired. Such capability to pause the display of pre-recorded images has been implemented in most consumer electronics equipment (e.g., video cassette recorders, compact disc players, cassette tape players) that is used to display pre-recorded images.

A difficulty is encountered in implementing the above-described conventional pausing method for images that are not pre-recorded, but, rather, are represented by display data that is only momentarily available to the display system for generation of an image display (as is the case, for example, with the broadcast of a television or radio program). Display data acquired by the display system during the pause cannot be immediately displayed, yet if this display data is discarded, part of the image can't be displayed. In many situations, this is undesirable or unacceptable.

This problem might be remedied by enabling the display system to store all of the display data acquired after beginning the pause, then resuming the display after all of the remaining display data of the image has been stored. However, this approach is undesirable because it is inflexible (the specification of any pause terminates the display of the image until all of the display data of the image has been acquired, e.g., until the television or radio broadcast is over) and because the display of the image extends for an undesirably long time (e.g., a pause early in a broadcast of a baseball game would mean that the end of the game would not be seen or heard until a couple of hours after the game was over).

Another possibility for addressing this problem is to store the display data acquired during the pause, then, when the pause is over, display the stored display data while simultaneously storing newly acquired display data. Such simultaneous displaying of previously stored data while storing newly acquired data would continue until all of the display data of the image has been acquired and displayed. Additional pauses cause the display to stop while even more data is stored. However, while this approach permits somewhat more flexibility—the observer can control when the display begins again by terminating a pause—it still causes the amount of time required to observe an image to increase by the total duration of the pauses. This may be undesirable or unacceptable if the observer has, or only desires to allot, a limited amount of time to view the display.

An approach to pausing the display of a time-varying image that overcomes the limitations of the above-discussed methods is desirable.

SUMMARY OF THE INVENTION

The invention enables an image display to be paused, then resumed at an accelerated rate until a time at which the content of the display corresponds to the content that would have been displayed had the image been displayed at a normal display rate without the pause, at which time display of the image at the normal display rate resumes. The invention enables flexibility in observing the image display, without destroying the continuity of the image display or causing the display to extend for an undesirably long time beyond a termination time that would occur if the display occurred at the normal rate without a pause (in many cases, the display does not extend at all beyond such termination time).

The invention can be used with display systems that generate a display from analog data or with display systems that generate a display from digital data. However, for analog display systems, the analog display data must be digitized for use with a method of the invention. The invention can be used with any type of image display, such as, for example, audio displays, video displays or audiovisual displays. The invention can be used with display systems that display pre-recorded images (such as are found on video or audio cassettes, or video or audio compact discs, for example) or with display systems that display images based upon display data that is only momentarily available to the display system (such as occurs in the display of television or radio broadcasts). The invention can be used with images that vary with time, as well as those that do not vary over long periods or those that may not vary at all (e.g., images generated from monitoring a site).

In one embodiment of the invention, a method for displaying an image over a period of time, the image being represented by an ordered set of display data, includes the steps of: i) acquiring display data from a data source; ii) transferring the display data to a display device as the display data is acquired; iii) displaying, at a first rate, an image generated from the display data transferred to the display device; iv) identifying a first instruction from a user that either directly or indirectly specifies a pause in the display of the image; v) in response to the first instruction, stopping the transfer of display data to the display device; vi) storing the display data acquired subsequent to the first instruction; vii) identifying a second instruction from a user that either directly or indirectly specifies resumption of the display of the image; viii) in response to the second instruction, transferring stored display data, in the order that the stored display data was stored, to the display device; ix) processing the stored display data, either before or after the stored display data is stored, in a manner that enables the stored display data to be displayed at a second rate that is greater than the first rate; x) displaying, at the second rate, an image generated from the processed stored display data transferred to the display device; xi) subsequent to identification of the second instruction, continuing to store display data so long as there is stored display data that has not yet been transferred to the display device, the amount of stored display data being gradually reduced by display of the stored data at the second rate that is greater than the first rate at which the display data need be stored to enable display of the display data at the first rate; and xii) upon stopping storage of acquired display data, again transferring the display data to the display device as the display data is acquired.

In another embodiment of the invention, a system for displaying an image over a period of time, the image represented by an ordered set of display data, includes: i) a mechanism for acquiring display data from a data source; ii) a mechanism for displaying an image generated from display data; iii) a mechanism for transferring display data to the mechanism for displaying; iv) a mechanism for storing acquired display data; and v) a mechanism for controlling the transfer of the acquired display data to the means for displaying. The mechanism for controlling includes a mechanism for processing stored display data, either before or after the stored display data is stored, in a manner that enables the stored display data to be displayed at a second rate that is greater than a first rate. If no instruction specifying a pause is received from a user, the mechanism for controlling causes the acquired display data to be immediately transferred to the mechanism for displaying for generation of the image at a first rate. When an instruction specifying a pause is received from the user, the mechanism for controlling causes the acquired display data to be stored in the mechanism for storing rather than being transferred directly to the mechanism for displaying. When an instruction specifying resumption of the display of the image is received from the user, the mechanism for controlling causes the processed stored display data to be transferred to the mechanism for displaying, in the order that the stored display data was stored, for generation of the image at the second rate. The mechanism for controlling also continues to cause the acquired display data to be stored in the mechanism for storing, rather than being transferred directly to the mechanism for displaying, so long as there is stored display data that has not yet been transferred to the mechanism for displaying, the amount of stored display data being gradually reduced by display of the stored data at the second rate that is greater than the first rate at which the display data need be stored to enable display of the display data at the first rate. When the storage of acquired display data stops after a resume instruction has been received, the mechanism for controlling again causes the acquired display data to be immediately transferred to the mechanism for displaying.

In yet another embodiment of the invention, a computer readable medium is encoded with one or more computer programs for enabling display of an image over a period of time, the image being represented by an ordered set of display data that, during normal operation of a display system, is used to generate an image at a first rate as the display data is acquired. The computer programs include: i) instructions for identifying a first instruction from a user that either directly or indirectly specifies a pause in the display of the image; ii) instructions for stopping, in response to the first instruction, the transfer of display data to the display device; iii) instructions for causing a data storage device to store the display data acquired subsequent to the first instruction; iv) instructions for identifying a second instruction from a user that either directly or indirectly specifies resumption of the display of the image; v) instructions for causing, in response to the second instruction, the transfer of stored display data, in the order that the stored display data was stored, to the display device; vi) instructions for processing the stored display data, either before or after the stored display data is stored, in a manner that enables the stored display data to be displayed at a second rate that is greater than the first rate; vii) instructions for continuing to store display data acquired subsequent to identification of a resume instruction, so long as there is stored display data that has not yet been transferred to the display device; viii) instructions for stopping, subsequent to identification of a resume instruction, storage of acquired display data when the stored display data has all been transferred to the display device; and ix) instructions for re-initiating the transfer, upon stopping storage of acquired display data, of display data to the display device as the display data is acquired so that the transferred display data can be used to generate an image at the first rate.

DETAILED DESCRIPTION OF THE INVENTION

Figure 1:
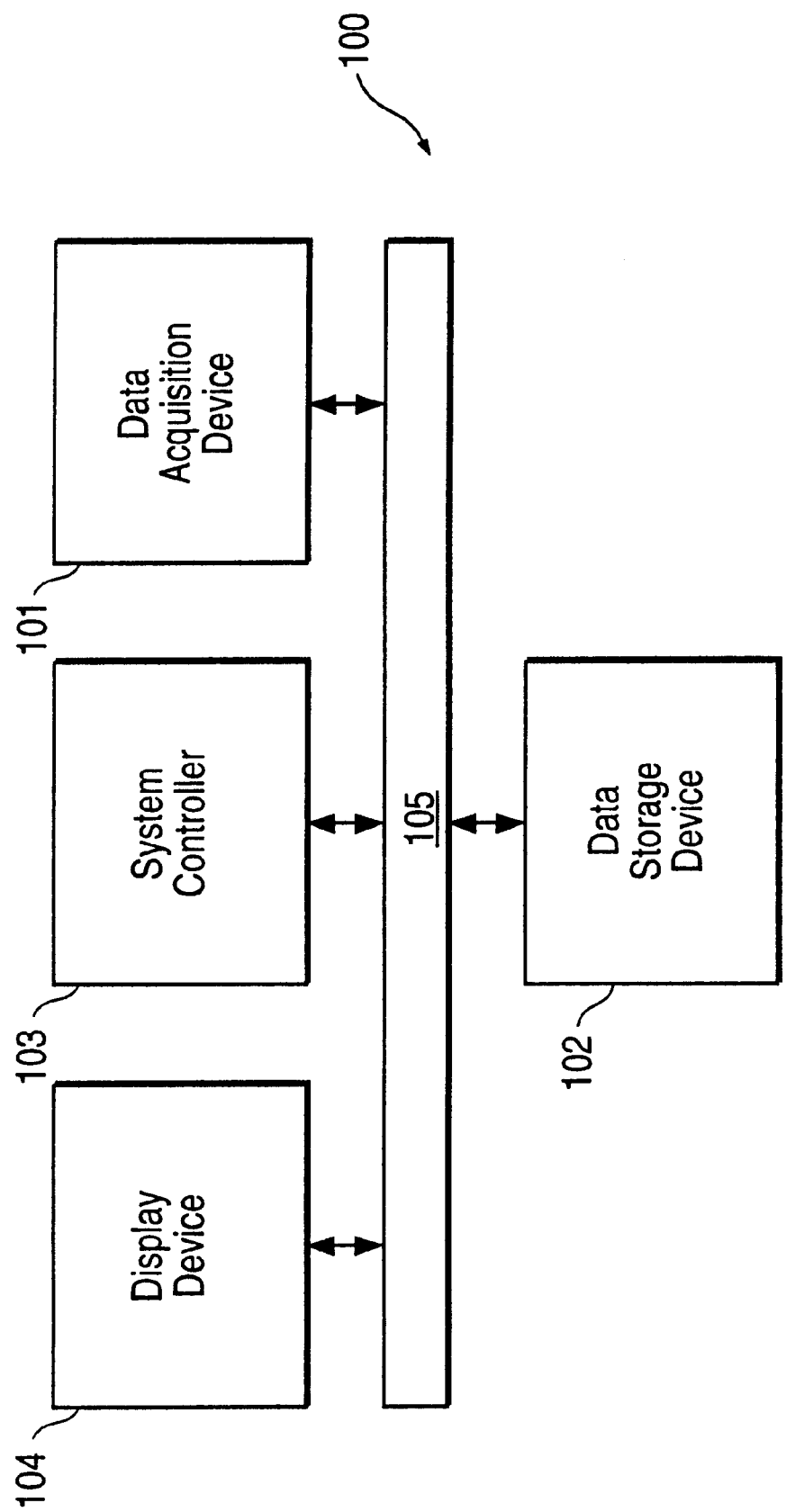
FIG. 1 is a block diagram of a system according to an embodiment of the invention.

The invention enables the display of an image to be paused, then, at the end of the pause, resumed at an accelerated rate (i.e., a rate that is faster than a normal display rate) until a time at which the content of the display corresponds to the content that would have been displayed had the image been displayed at the normal display rate without the pause, at which time display of the image at the normal display rate resumes. In other words, after a pause, the invention speeds up the image display so that the display "catches up" to where it would have been without the pause, then slows the display back to the normal display speed.

The invention can be used with display systems that display pre-recorded images (such as are found on video or audio cassettes, or video or audio compact discs, for example) or with display systems that display images based upon display data that is only momentarily available to the display system (such as occurs in the display of television or radio broadcasts). The invention can be used with either analog or digital display systems. Further, the invention can be used with any type of image display, such as, for example, audio displays, video displays or audiovisual displays, including such displays that also include display of textual data. Additionally, while it is contemplated that the invention has particular utility in displaying images that vary with time, the invention can also be used with image displays in which the image does not vary over long periods of time during the image display or in which the image may not vary during the entire image display, such as may occur when the image is generated from monitoring a site.

The invention enables a great deal of flexibility in observing the display of an image. The invention can enable an observer of an image display to pause and resume the display as desired, usually without having to spend more time to view the displayed image than would otherwise be required (i.e., the time required if the image were displayed at the normal display rate without pauses), and without missing any part of the displayed image. For example, it is contemplated that the invention could be advantageously used in viewing television programs. If, during a television program, a viewer wants to temporarily stop watching to go to the bathroom or to take a phone call, the invention allows the viewer to pause the display of the program, then, after resuming the display of the program upon return, watch the program at an accelerated speed until the display of the program catches up to the broadcast of the program. Thus, the television viewer has the flexibility to attend to other matters while a program is being broadcast, without sacrificing viewing any of the content of the program or, in many cases, enduring the inconvenience of spending additional time to finish watching the program.

The invention can also be tailored to enable an observer who has begun observing an image display at later than a designated start time to begin observing the image display at an accelerated rate until the display catches up to the point at which the display would be if the image had been viewed at a normal display rate beginning at the designated start time. For example, the invention could be used with a display system that is showing a meeting, at a location remote from the location of the meeting, as the meeting takes place. If a meeting attendee at the remote location arrives late, then the invention causes the beginning of the meeting to be displayed at an accelerated rate until the display of the meeting at the remote location coincides with the meeting activity at that time. The invention could also be used, in a manner similar to that described above, to enable the remote attendee to miss some portion of the meeting.

FIG. 1 is a block diagram of a system 100 according to the invention. Display data from a data source is acquired by a data acquisition device 101 and transmitted via a bus 105 to a system controller 103 which, in turn, transmits the display data via the bus 105 to a display device 104 for generation of an image from the display data. During "normal" display of the image, the system controller 103 causes the display data to be transmitted immediately to the display device 104 at the same rate at which the display data is acquired from the data acquisition device 101. When a user of the system 100 pauses the display of the image by the display device 104, the system controller 103 causes the display data to be transferred via the bus 105 to the data storage device 102 during the pause, rather than transmitting the display data to the display device 104. When the user ends the pause, the system controller 103 causes the stored display data to begin being transmitted from the data storage device 102 to the display device 104 (and the display device 104 displays the data) at an effective rate that is greater than the rate at which display data is being acquired from the data acquisition device 101. This can be accomplished, for example, by compressing the stored data before transmitting the stored data to the display device 104 for display. Since new display data is still being acquired from the data acquisition device 101 when the display of the image resumes, and the newly acquired display data can not be transmitted to the display device 104 until the stored display data has all been transmitted from the data storage device 102 to the display device 104 for display, the system controller 103 continues to cause the data storage device 102 to store the display data acquired from the data acquisition device 101. Operation of the system 100 continues in this way—transmitting stored display data to the display device 104 at an accelerated rate, while simultaneously storing new display data acquired from the data source at the normal rate—until all of the stored display data has been transmitted, i.e., the next display data to be transmitted to the display device 104 is display data that has just been acquired from the data acquisition device 101. At that time, transmission of stored display data from the data storage device 102 to the display device 104 ends, and the display data is once again transmitted to the display device 104 immediately as the display data is acquired from the data acquisition device 101.

The data source can be embodied in a wide variety of ways. For example, the data source could be a video cassette, a video compact disc, an audio cassette tape, an audio compact disc, a television or radio transmission station, or a computer data storage medium (e.g., hard disk) on which display data files are stored (located either at the site of the system 100 or at a remote location interconnected to the system 100 by a computer network such as the Internet).

The data acquisition device 101, the data storage device 102, the system controller 103, the display device 104 and the bus 105 can each be implemented using conventional computer hardware and/or other conventional devices that are controlled using conventional computer programming or other appropriate techniques, as known to those skilled in such arts. For example, the data acquisition device 101 can be a conventional television tuner or a conventional computer modem. The data storage device 102 can be a conventional computer hard disk. The display device 104 can be, for example, a conventional video display device (such as a computer display monitor or television monitor) or audio display device (such as speakers in a radio or stereo). The system controller 103 can be a conventional microprocessor and associated conventional computer hardware necessary to carry out various control functions. The bus 105 can be any conventional computer bus. These components are interconnected using methods and hardware known to those skilled in that art, and may be augmented by other conventional computer hardware, not shown in FIG. 1, as also known to those skilled in that art.

Figure 2:
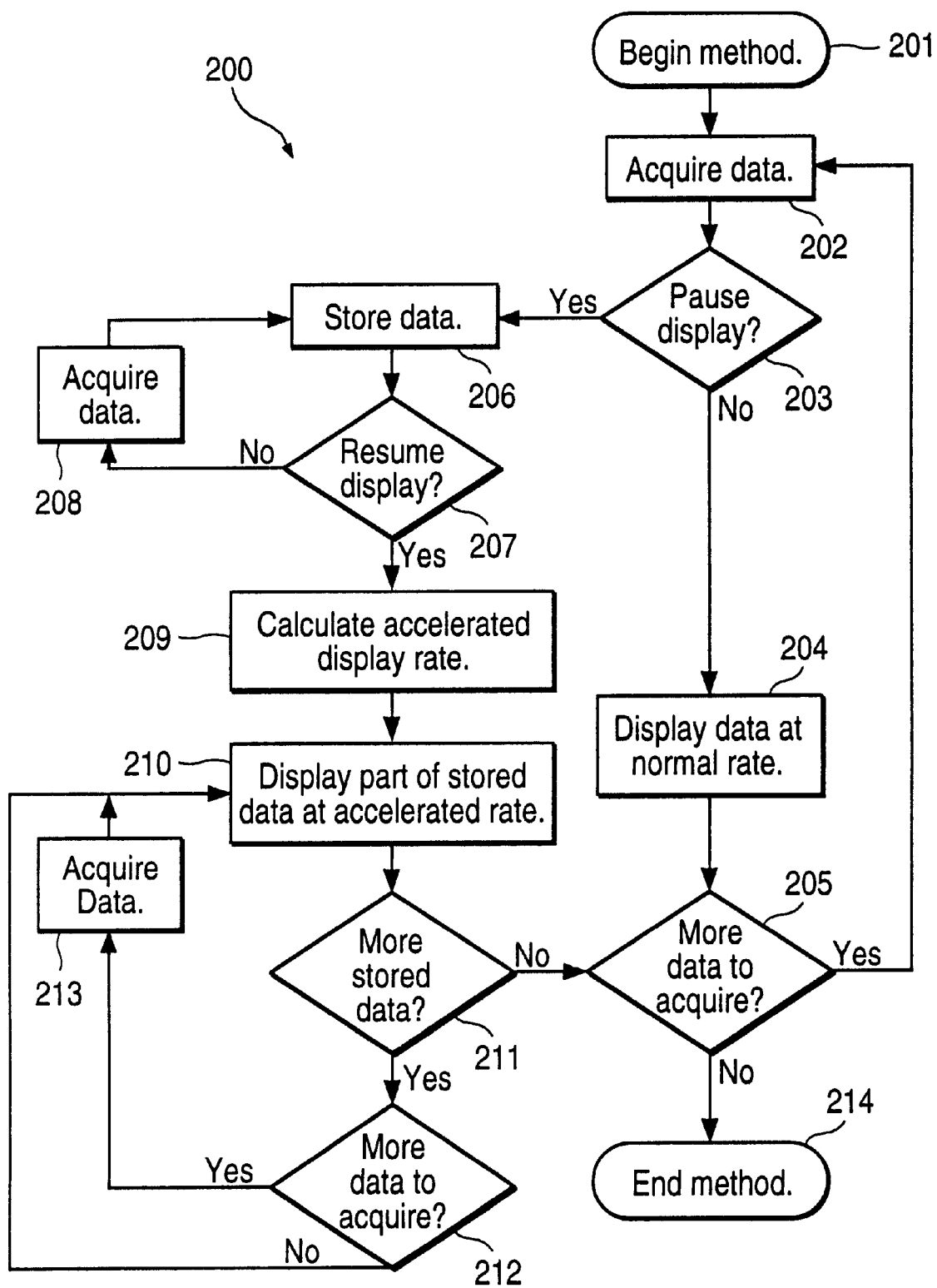
FIG. 2 is a flow chart of a method according to an embodiment of the invention.

FIG. 2 is a flow chart of a method 200 according to an embodiment of the invention. The method 200 can be implemented, for example, by the system 100 described above with respect to FIG. 1 or by the system 400 described below with respect to FIG. 4. Generally, the steps of the method 200 can be implemented on any conventional digital computer that is programmed to perform the below-described functions of the method 200.

Figure 3:
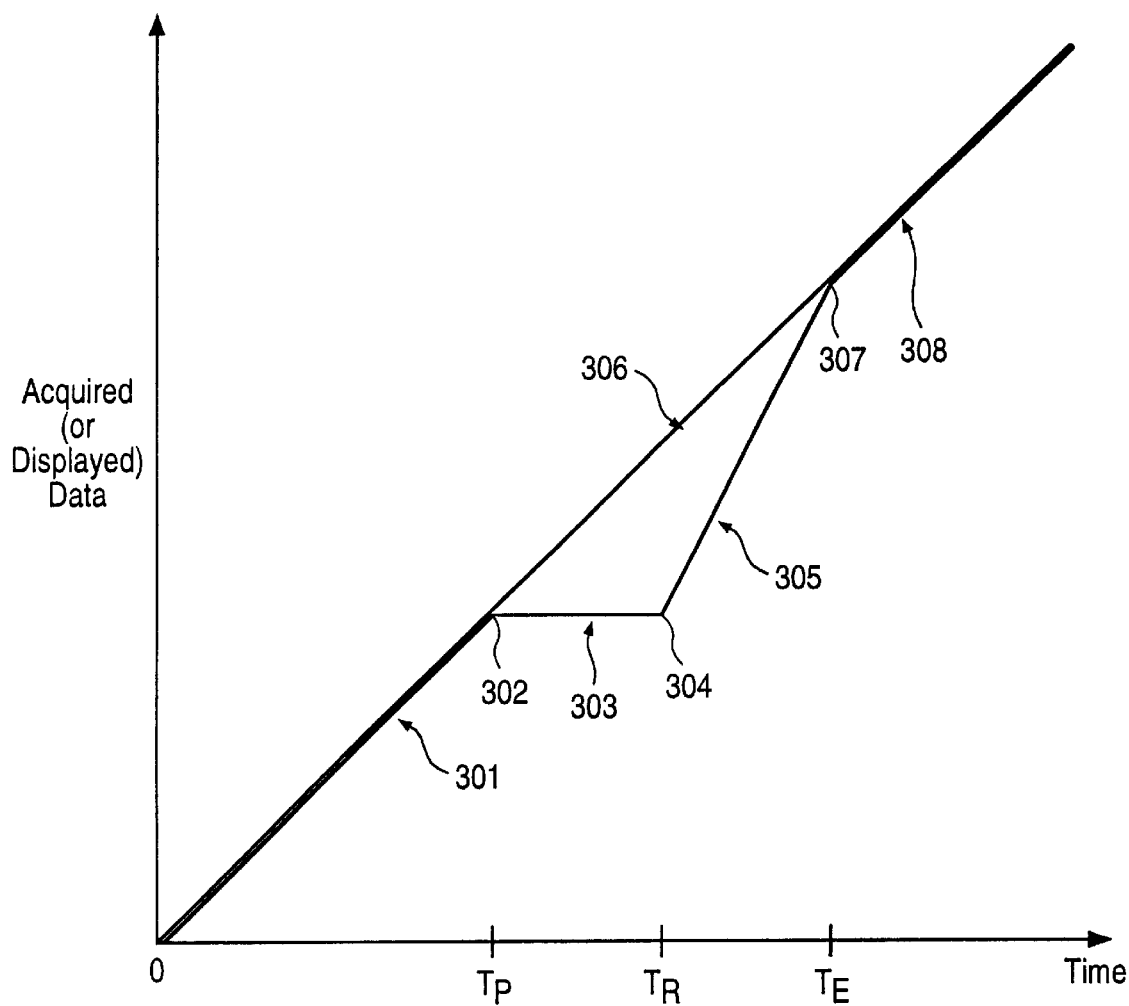
FIG. 3 is a graphical illustration of operation of the invention.

FIG. 3 is a graph of sequential data position (increasing upward along the vertical axis) versus time (increasing to the right along the horizontal axis), illustrating operation of the invention. Two graphs are shown: one is of acquired display data (the upper graph), the other is of displayed display data (the lower graph). The rate (or effective rate) at which display data is acquired or displayed at any given time is equal to the slope of the appropriate graph at that time.

The block 201 in FIG. 2 indicates the beginning of the method 200, i.e., the time at which acquisition of display data begins (and at which the display of the image represented by the display data may also begin). This is shown at time zero in FIG. 3.

In the step shown in the block 202 (referred to hereinafter as step 202), display data is acquired from a data source.

In the step shown in the block 203 (referred to hereinafter as step 203), a determination is made as to whether the display is to be paused. A pause can be indicated in any appropriate manner. For example, a system in which the method 200 is implemented can include a conventional user interface (e.g., a pushbutton on a console or an icon on a computer display screen) that enables a user of the system to instruct the system to pause the display. As will be described in more detail below, a pause can also be specified indirectly by specifying that an instant replay of previously displayed data be displayed.

A system in which the method 200 is implemented could also be configured so that a pause is automatically specified when the method 200 begins. A system might be configured in this way when used in an application such as the networked meeting application described above.

If, in step 203, a pause has not been specified, then, in the step shown in the block 204 (referred to hereinafter as step 204), the acquired display data is immediately displayed at a normal display rate. "Display rate" means the effective rate at which display data must be used to generate the image display at the speed at which the image display appears to an observer of the display. "Normal display rate" means the display rate that is used to display the image during normal operation of the system and can, generally, have any magnitude. Typically, the normal display rate is equal to the rate at which the display data is acquired from the data source.

The acquisition and display of display data in steps 202 and 204 is shown in FIG. 3 by the time period indicated generally by the arrow 301. As seen in FIG. 3, the data is both acquired and displayed at the normal display rate (shown by the slope of the graph), the data being displayed immediately upon being acquired.

In the step shown in the block 205 (referred to hereinafter as step 205), a determination is made as to whether there is more display data to acquire from the data source. If not, then the method 200 terminates, as shown by block 214, i.e., the display of the image has been completed. If so, then the method 200 returns to step 202 for the acquisition of more display data from the data source.

If, in step 203, a pause has been specified, then, in the step shown in the block 206 (referred to hereinafter as step 206), the display data acquired from the data source is stored as the display data is acquired.

In the step shown in the block 207 (referred to hereinafter as step 207), a determination is made as to whether the display is to be resumed. Resumption of the display can be indicated by the user in any appropriate manner, such as through use of one of the mechanisms described above for specifying a pause.

If the display is not to be resumed, then, in the step shown in the block 208 (referred to hereinafter as step 208), additional display data is acquired from the data source. The newly acquired display data is also stored, as indicated by step 206. This continues until resumption of the display is indicated.

The beginning of a pause is shown as the time $T_P$ and designated by the numeral 302 in FIG. 3. During the time period of the pause, indicated generally by the arrow 303, no display data is displayed (i.e., the slope of the graph of the displayed data is zero); however, display data continues to be acquired at the normal rate during the period of the pause (as well as during the data display speedup period, discussed below) and stored (steps 206 and 208), as indicated generally by the arrow 306 in FIG. 3.

If, in step 207, resumption of the display is specified, then, in the step shown in the block 209 (referred to hereinafter as step 209), an accelerated display rate is calculated. The calculation of the accelerated display rate is discussed in more detail below.

In the step shown in the block 210 (referred to hereinafter as step 210), the display of the stored display data at the accelerated display rate is begun. This is shown as the time $T_R$ and designated by the numeral 304 in FIG. 3. The accelerated display rate is evidenced in FIG. 3 by the steeper slope of the graph of the displayed data after the pause, as compared to the slope of the graph before the pause.

In the step shown in the block 211 (referred to hereinafter as step 211), a determination is made as to whether there is more stored display data to display. The acceleration of the display rate causes display data to be removed from the data storage medium faster than newly acquired display data is stored in the data storage medium. Thus, if, in step 211, there is no more stored display data to display, this indicates that the display has been accelerated for a period of time sufficient to enable the display of data to occur immediately after acquisition of the display data, i.e., normal display operation can resume. In that case, the method 200 returns to step 205 for a determination as to whether there is more display data to acquire (and display).

The period of time during which the data display occurs at the accelerated rate is referred to as the "data display speedup period" and is designated by the arrow 305 in FIG. 3. At the time $T_E$, designated by the numeral 307, the data display speedup period ends. Subsequent to the time $T_E$, both data acquisition and data display occur at the normal rate until either the acquisition and display of data stops (as indicated generally by the arrow 308) or another pause occurs (not shown in FIG. 3).

If, in step 211, there is additional stored display data to display, then, in the step shown in the block 212 (referred to hereinafter as step 212), a determination is made as to whether there is more display data to acquire. If so, then, in the step shown in the block 213 (referred to hereinafter as step 213), additional display data is acquired. The method 200 then returns to the step 210 for the display of additional stored display data. The display (step 210) and acquisition (step 213) of display data continues in this fashion until there is no more stored display data to display (step 211).

If, in the step 212, it is determined that there is no more display data to acquire, then the method 200 returns to the step 210 for the display of additional stored display data. The display of stored display data continues in this fashion until there is no more stored display data to display (step 211). (At that time, the method 200 is ended, as shown by block 214, since the determination of step 205 necessarily results in an indication that there is no more display data to acquire.) This situation can occur if a pause ends sufficiently close to the end of the display data so that it is not possible (or, more likely, not desirable) to display the data at a rate that is accelerated enough to cause the display to end at the same time that acquisition of display data ends.

As described above, during the time between a pause instruction and a resume instruction, the image display is stopped. Typically, some or all of the last displayed portion of the image (e.g., the last displayed video frame of an audiovisual image can be displayed, without the corresponding audio, if any) remains displayed until the resume instruction occurs. However, this need not necessarily be the case.

In another embodiment of the invention (the "instant replay" embodiment), the method 200 is modified to recognize another type of user instruction which specifies that a portion of the image that was most recently displayed is to be redisplayed ("instant replay"). The amount (i.e., duration of time) of the image to be redisplayed can be predetermined, or the method 200 can be further modified to recognize a user instruction that specifies an amount of the image to be redisplayed. The method 200 can also be modified to recognize user instructions that enable the user to cause the instant replay to be displayed at any speed (i.e., a speed slower than, equal to, or faster than the normal display rate) and any number of times. A system for implementing the invention can include an appropriate user interface or interfaces (e.g., GUI), as known to those skilled in the art, to enable the user to specify user instructions as discussed above.

While display of an instant replay is occurring, the display data representing the portion of the image display that would otherwise have occurred during that time is stored as described above. When the user indicates that the display of the instant replay is over, the image display is resumed again as described above. Thus, in the instant replay embodiment, pausing and resumption of the image display occurs as described above; however, the "dead time" during the pause is used to show an instant replay. Resumption of the image display after an instant replay can be indicated directly (by, for example, indicating a resume instruction as discussed above) or indirectly (as a consequence, for example, of the specification of the duration of time of the instant replay and the number of times that the instant replay is to be displayed).

The method 200 must be modified in another respect to implement the instant replay embodiment of the invention. Before a pause or instant replay instruction has been indicated, newly acquired display data is stored, in addition to being immediately used to generate a display. (Hereinafter, this stored display data is referred to as "instant replay data.") This is necessary to enable an instant replay to be generated at any time. Only a predetermined amount of instant replay data—enough to generate an instant replay of a predetermined maximum time duration—is stored at any one time. If the predetermined amount of instant replay data has already been stored, then the oldest stored instant replay data is discarded as newly acquired data is stored as instant replay data. Once the pause or instant replay instruction is indicated, the storage of instant replay data is stopped. (However, storage of display data to be used in generating the image display after the end of the instant replay or pause period begins, as described above.) If appropriate (i.e., if an instant replay, rather than a pause, has been specified), the stored instant replay data is then accessed and used to generate an instant replay of the specified duration.

After the instant replay or pause period ends, the new display data to be displayed can be stored as the instant replay data as described above (i.e., with the new instant replay data forcing the oldest instant replay data to be discarded), or the storage of instant replay data can begin completely anew. In the latter case, it may be desirable to disable the instant replay capability for a period of time after resumption of the image display. For example, the instant replay capability could be disabled until the predetermined amount of instant replay data has been stored after resumption of the image display, so that an instant replay of any duration up to the maximum allowed duration can be generated whenever the instant replay capability is available.

As indicated above, during the data display speedup period 305 (FIG. 3), the display data is displayed at an accelerated rate (speedup rate, S). The speedup rate, S, is given by the following equation:

$$S=(T_E-T_P)/(T_E-T_R) \qquad (1)$$

The beginning and end of the pause, $T_P$ and $T_R$, respectively, are established by the user inherently as part of pausing and resuming the display. Thus, the speedup rate, S, can be specified directly, or indirectly by specifying the end of the speedup period, $T_E$. If the end of the speedup period, $T_E$, is specified, then the speedup rate, S, must be calculated from equation (1) above. In certain situations, such as where a specified speedup rate, S, would not result in finishing display of an image by the time at which the last display data is acquired, it may be necessary or desirable to calculate a new speedup rate, S, based upon a pre-specified end of the speedup period, $T_E$, e.g., the scheduled end of the image display.

A system for implementing the invention can include a user interface (e.g., a menu of discrete choices or a GUI such as a slider bar) that allows the user to specify the speedup rate, S. Further, this user interface can be implemented so that the user can specify a default speedup rate, S, before displaying an image and/or the user can specify a speedup rate, S, dynamically during display of the image (in particular, during the data display speedup period 305). The user interface can be implemented to enable specification of the speedup rate, S, directly and/or indirectly, as discussed above.

Generally, any method for speeding up the display of data during the data display speedup period 305 can be used. For example, standard audio or video data compression techniques can be used to compress the stored audio or video display data before transmitting the display data to a display device for display. The particular display speedup method used can be dependent upon the type of display data. Additionally, if more than one type of display data is being displayed (e.g., audio and video data), then the speeded-up display of the two types of data must be synchronized.

For example, if the display data includes audio and video data, the audio data could be speeded up and the video data synchronized with the speeded up audio data (resulting in speedup of the video data). Methods of accomplishing such audio speedup and video synchronization are described in detail in the commonly owned, co-pending U.S. patent application entitled "Variable Rate Video Playback with Synchronized Audio," by Neal A. Bhadkamkar, Subutai Ahmad and Michele Covell, attorney docket number I0359-991160, filed on the same day as the present application, the disclosure of which is incorporated by reference herein. A brief description of one of the methods described therein is given immediately below. As is readily apparent from those descriptions, those methods have the advantage that the audio can be speeded-up to rather accelerated rates (e.g., at least approximately twice the normal rate) while maintaining proper pitch (i.e., the voices don't sound like chipmunks) and, therefore, intelligibility.

In one of the above-mentioned methods of Bhadkamkar, Ahmad and Covell, the audio data set can be divided into non-overlapping segments of equal length. A correspondence between the audio and video data can also be established so that the segments of audio data correspond to a known amount of the video data. In one approach, the beginning and end of each audio segment can be overlapped with the end and beginning, respectively, of adjacent audio segments. The audio data of corresponding overlapped portions of adjacent segments are blended and replaced by the blended audio data, which has a length equal to the length of one of the two overlapped portions. Thus, the audio data set is reduced in length by the sum of all of the overlap lengths. The possible lengths of each overlap are constrained in accordance with the amount of compaction of the audio data (i.e., speedup) that is desired. However, within this constraint, the length of each particular overlap is chosen so that the pitch pulses of the overlapped portions closely overlap. Consequently, the blending of the audio data of the overlapped portions does not greatly distort the sound corresponding to the overlapped portions of audio data. Thus, the invention enables the audio data set to be condensed a desired amount (i.e., the display of an audio data set can be speeded up as desired), while minimizing the amount of distortion associated with the compaction of the audio data set (i.e., the speeded-up display sounds "normal"). Video data is deleted from the original set of video data in accordance with the elimination of audio data from the original audio set. The deletion of video data is accomplished in a manner that maintains the original correspondence of the remaining audio data to the video data, and that produces a reduced set of video data having the same "length" as the audio data set.

Figure 4:
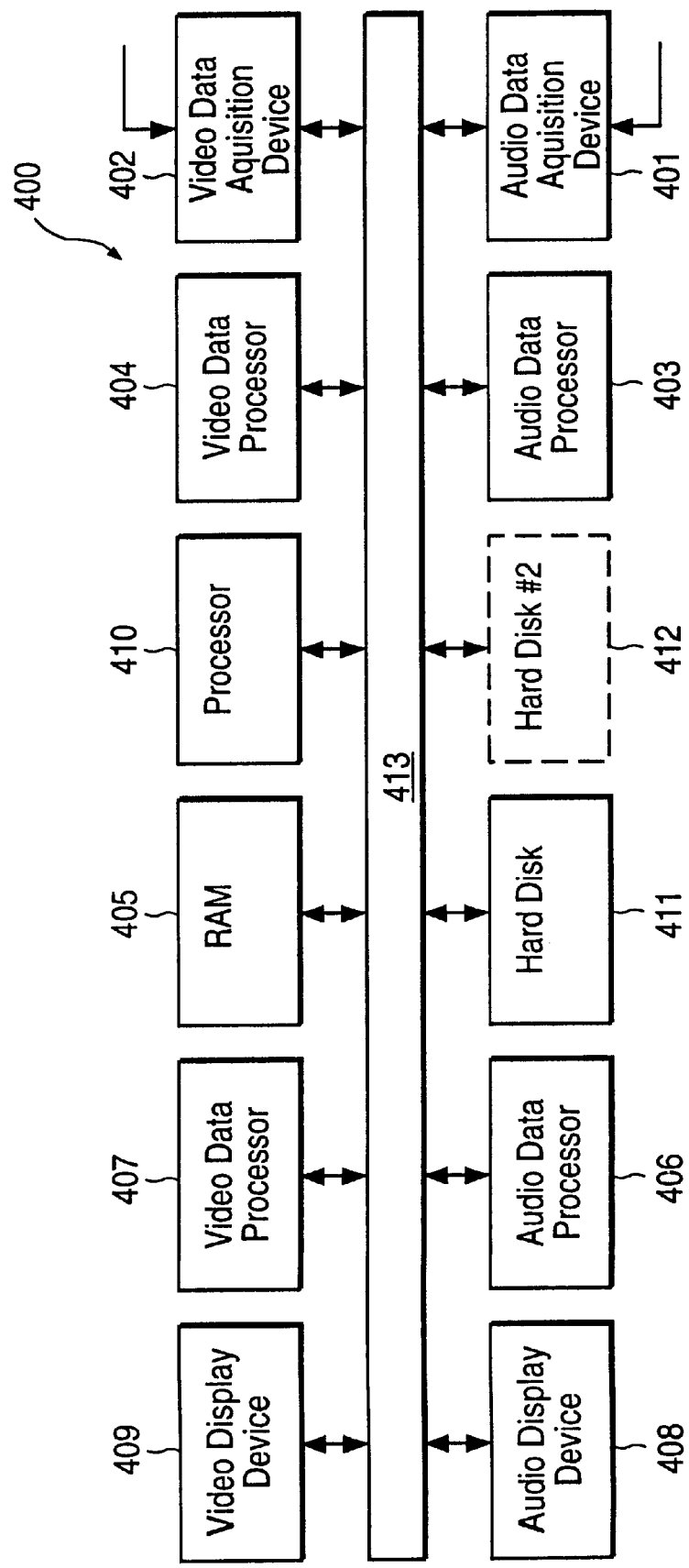
FIG. 4 is a block diagram of a system according to another embodiment of the invention.

FIG. 4 is a block diagram of a system 400 according to another embodiment of the invention. The system 400 is a particular implementation of the more general system 100 of FIG. 1. The system 400 is appropriate for use in displaying images that can include both audio and video data, such as typically appear in television programs, for example.

The system 400 includes a bus 413 via which the various devices (described below) of the system 400 communicate and transfer display data to each other. The bus 413 can be implemented by any appropriate conventional computer bus, as known to those skilled in that art.

An audio data acquisition device 401 acquires audio data from an audio data source and a video data acquisition device 402 acquires video data from a video data source. The audio and video data sources can be embodied as described above with respect to FIG. 1. The audio data acquisition device 401 and video data acquisition device 402 can be embodied by conventional such data acquisition devices.

The acquired audio and video data are input to an audio data processor 403 and a video data processor 404, respectively. The audio data processor 403 and video data processor 404 can be used to perform any desired processing of the audio and video data—such as, for example, compression of the audio and video data—and can be embodied by, for example, conventional audio and video cards, as known to those skilled in the art of audio and video data processing.

The processed audio and video data are input to a random access memory (RAM) 405 or other appropriate rapidly accessible memory.

If display of the data is not paused, then the audio and video data are output from the RAM 405 to a second audio data processor 406 and a second video data processor 407, respectively. If the audio and video data were compressed by the audio data processor 403 and video data processor 404, then the audio data processor 406 and video data processor 407 may be used to decompress the data. The audio data processor 406 and video data processor 407 can also be used to perform any other desired processing. To the extent that the audio data processor 406 and video data processor 407 process the data in a conventional manner, the audio data processor 406 and video data processor 407 can be embodied by, for example, conventional audio and video cards. In the system 400, the audio data processor 406 and video data processor 407 can also be used to perform the display speedup, as discussed above. To that extent, the audio data processor 406 and video data processor 407 can be implemented in a conventional digital computer that is appropriately programmed to perform the functions of the speedup method that is used, or in firmware.

The processed data from the audio data processor 406 and video data processor 407 are displayed by the audio display device 408 and video display device 409, respectively. The audio display device 408 can be any appropriate such device, such as, for example, one or more audio speakers. Likewise, the video display device 409 can be any appropriate such device, such as, for example, a television or computer display device.

A processor 410 controls operation of the system 400, e.g., the processor 410 controls the input of data to, and the output of data from, the RAM 405. The processor 410 can be embodied by any appropriate conventional processor that is capable of handling intensive audio and video display calculations, as known to those skilled in that art. Illustratively, the invention can be implemented, at least in part, on an "Indy" workstation computer made by Silicon Graphics Incorporated (SGI) of Mountain View, Calif. (this computer can embody the RAM 405, processor 410, and hard disks 410 and 412, for example). It is believed that computers including Pentium processors made by Intel Corporation of Santa Clara, Calif. are also robust enough to enable implementation of the invention. The interface of such computers with video cards and audio cards used to embody the video processors 404 and 407 and the audio processors 403 and 406 is known to those skilled in that art.

During operation of the system 400, when the user issues a pause instruction (or instant replay instruction) to the system 400, the processor 410 immediately stops display data from being transferred from the RAM 405 to the audio data processor 406 and video data processor 407, and causes the display data to be transferred instead to the hard disk 411. This continues until the user issues a resume instruction to the system 400. When the resume instruction is issued, the processor 410 causes the display data stored on the hard disk 411 to be transferred to the audio data processor 406 and video data processor 407 at the accelerated rate (except in certain embodiments, described below, in which the display data acquired during the pause has been compressed before storage by a factor equal to the inverse of the accelerated rate) that is greater than the rate at which the newly acquired data is being stored on the hard disk 411. Storage of data on the hard disk 411 at the normal rate and transfer of data from the hard disk 411 at the accelerated rate continues until no more display data is stored on the hard disk 411, i.e., the most recently stored data on the hard disk 411 is immediately transferred to the audio data processor 406 and video data processor 407. The hard disk 411 can be embodied by any conventional hard disk having sufficient data storage capacity and adequate operating speed (i.e., access and storage speed), as discussed in more detail below. It is also to be understood that the hard disk 411 can be replaced by any other data storage device possessing adequate storage capacity and operating speed.

To implement the instant replay embodiment of the invention, another memory device could be added to the system 400, or a portion of the RAM 405 or hard disk 412 could be used to store the instant replay data. Illustratively, the instant replay data could be stored in a first-in, first-out (FIFO) buffer that is controlled to store the predetermined amount of data corresponding to an instant replay of a maximum duration.

As described above, a single hard disk can be used to store display data during the pause period 303 (FIG. 3). However, given current hard disk operating speeds and typical amounts of audio and video data, a single hard disk may be inadequate. In particular, typical quantities of video data strain the capability of a single hard disk to meet the requirements of the invention. For example, television video data is supplied at a rate of 30 frames per second. During the data display speedup period 305 (FIG. 3), the video data must be stored at a rate of 30 frames per second and accessed at a rate of S * 30 frames per second (where S, the speedup rate, is greater than 1), i.e., the hard disk must be able to access (or store) data at a rate in excess of 60 frames per second. Typical current hard disks require approximately 10 milliseconds per seek, approximately 5 milliseconds for data to arrive under the transducing head, and another approximately 5 milliseconds to read or write each frame of video data (assuming 10–20 kilobytes of video data per frame of MPEG compressed audio/video data), i.e., approximately 20 milliseconds to access or store a frame of video data or, in other words, an ability to access or store approximately 50 frames per second. As can be seen, this is somewhat less than the absolute minimum of 60 frames per second, and substantially less than a typical requirement of 75 frames per second (corresponding to a speedup rate, S, of 1.5). Thus, if one hard disk is used, it may be necessary to carefully limit the speedup rate, S, use the system only for displaying images that are represented by a relatively small amount of data (e.g., low frame rate video, or images that have few variations over time or within a related set of data—such as a frame of video data—so that the amount of compressed data per frame is reduced), and/or use the system only with the fastest available hard disks.

The hard disk operating speed problem can also be addressed by using multiple hard disks. The use of multiple hard disks is illustrated in FIG. 4 by the dashed lines representing a second hard disk 412 and the associated interconnection to the bus 413. Such a system can operate as follows. When the pause period 303 (FIG. 3) begins, the acquired display data is stored on the hard disk 411. When the data display speedup period 305 (FIG. 3) begins, data storage on the hard disk 411 stops, and the acquired display data is stored instead on the hard disk 412. The display data previously stored on the hard disk 411 is transferred to the audio data processor 406 and video data processor 407 for eventual display by the audio display device 408 and video display device 409. When all of the display data stored on the hard disk 411 has been transferred from the hard disk 411, data storage on the hard disk 412 stops, and the acquired display data is once again stored on the hard disk 411. The display data stored on the hard disk 412 is transferred to the processors 406 and 407 for display by the display devices 408 and 409 until all of the stored display data on the hard disk 412 has been displayed. Data storage to the hard disk 412 and data transfer from the hard disk 411 then begins again. This flip-flopping between hard disks 411 and 412 continues throughout the data display speedup period 305. The use of a multiple hard disk system reduces the operational speed requirements for the hard disks. It also necessitates more complicated buffering in the RAM 405 to avoid interruptions during switches between hard disks; however, such buffering can be accomplished in a manner known to those skilled in the art. It may also necessitate a relatively large buffer in the RAM; however, sufficiently large buffers are implemented in currently available RAMs.

The limitations of hard disk operating speed can also be addressed by using a hard disk which includes two transducing heads for each platter of the hard disk. Many current hard disks incorporate such a configuration. The use of such a hard disk enables data storage and data access to occur simultaneously, thus approximately doubling the operating speed of the hard disk. The implementation of control of such a dual-head hard disk to enable such simultaneous access and storage is known to those skilled in that art.

The limitations of hard disk operating speed can also be addressed by using a hard disk system known as a "disk-array." A disk-array hard disk system includes multiple disks, as well as a transducing head for each disk. Again, the use of such a hard disk system enables data storage and data access to occur simultaneously, thus increasing the operating speed of the hard disk system. The implementation of control of a disk-array hard disk system to enable simultaneous access and storage is known to those skilled in that art.

The limitations of hard disk operating speed can also be addressed by compressing the acquired display data after acquisition and before storage on a hard disk. When the stored data is retrieved from the hard disk, the data is decompressed before being used to generate a display. While this can result in a loss of image quality in the display, such detrimental effect on the image quality can be acceptable in many applications.

The limitations of hard disk operating speed can also be addressed by constraining (pre-specifying) the speedup rate, S, to be a known number, such as 1.5, and using one of several methods to systematically reduce, by a factor equal to the inverse of the speedup rate, S, the amount of acquired display data stored to the hard disk. The desired reduction in display data to be stored can be accomplished, for example, by storing only some fractional portion (equal to 1/S) of the acquired display data, the unstored portion of the acquired display data being selected so that the displayed image does not greatly suffer from the absence of that display data. For example, if the data is video data or audiovisual data and the pre-specified speedup rate, S, is 1.5, then every third frame of acquired video data can be dropped (i.e., not stored on the hard disk). During retrieval of the stored display data, the dropped frame of video data can be recreated, if necessary or desired, by repeating the frame of video data either just before or just after the dropped frame of video data. The desired reduction in display data to be stored can also be accomplished by using the pre-specified speedup rate, S, to speed up the acquired display data before the display data is stored on the hard disk. (In this case, the method of speedup used would be implemented in the system 400, for example, as part of the audio data processor 403 and video data processor 404.) For example, conventional compression techniques or the method of Bhadkamkar, Ahmad and Covell (described above) can be used. This speedup is in addition to any other data compression performed as part of a system of the invention. In this second method, the retrieved display data does not require any additional processing before the display data is used to generate a display.

Hard disk data storage capacity may be of relatively little concern in a system according to the invention, since only enough data storage capacity to store data during the pause period 303 (FIG. 3) is required (because, after the pause period 303, data will be transferred from the hard disk faster than data is stored on the hard disk). For example, a typical amount of high quality MPEG compressed audio/video data would be 300 kilobytes per second. Pausing the display for 5 minutes would, therefore, require approximately 90 megabytes of hard disk storage, well within the capacity of current hard disks. If a multiple hard disk system is used, the hard disk storage requirements for each disk are decreased even further. In some applications, the data storage requirements may be sufficiently small so that the hard disk can be eliminated altogether and a RAM (typically, a relatively large RAM) used for data storage.

As discussed above, the processors 403 and 404, and the processors 406 and 407, can be used for data compression and decompression, respectively. Since, as discussed immediately above, data storage requirements may not be severe for a system of the invention, data compression and decompression may be unnecessary for purposes of reducing data storage requirements However, data compression and decompression may be necessary to facilitate adequate access from, and storage to, the hard disk, as discussed above, since the data compression effectively reduces the amount of data that must be accessed or stored for each portion (e.g., frame of video data) of the displayed image. If data compression and decompression are not necessary for this purpose (such as would be the case in the two hard disk system), then they may be dispensed with altogether.

Various embodiments of the invention have been described. The descriptions are intended to be illustrative, not limitative. Thus, it will be apparent to one skilled in the art that certain modifications may be made to the invention as described above without departing from the scope of the claims set out below.

We claim:

1. A method for displaying an image over a period of time, the image represented by an ordered set of display data, the method comprising the steps of:

acquiring display data from a data source;

transferring the display data to a display device as the display data is acquired;

displaying, at a first rate, an image generated from the display data transferred to the display device;

identifying a first instruction from a user that either directly or indirectly specifies a pause in the display of the image;

in response to the first instruction, stopping the transfer of display data to the display device;

storing the display data acquired subsequent to the first instruction;

identifying a second instruction from a user that either directly or indirectly specifies resumption of the display of the image;

in response to the second instruction, transferring stored display data, in the order that the stored display data was stored, to the display device;

processing the stored display data, either before or after the stored display data is stored, in a manner that enables the stored display data to be displayed at a second rate that is greater than the first rate;

displaying, at the second rate, an image generated from the processed stored display data transferred to the display device;

subsequent to identification of the second instruction, continuing to store display data so long as there is stored display data that has not yet been transferred to the display device, the amount of stored display data being gradually reduced by display of the stored data at the second rate that is greater than the first rate at which the display data need be stored to enable display of the display data at the first rate;

upon stopping storage of acquired display data, again transferring the display data to the display device as the display data is acquired;

specifying the time at which the step of again transferring is to begin; and calculating the second rate based upon the specified time, the time at which resumption of the display of the image begins, the amount of stored display data at the time at which resumption of the display of the image begins, and the first rate.

2. A method as in claim 1, wherein the data source includes pre-recorded display data, such that next display data can be acquired at any time during the method, the next display data being display data that should be transferred to the display device after the most recently transferred display data.

3. A method as in claim 1, wherein next display data is only momentarily available from the data source, the next display data being display data that should be transferred to the display device after the most recently transferred display data.

4. A method as in claim 1, wherein the display data includes audio data.

5. A method as in claim 1, wherein the display data includes video data.

6. A method as in claim 1, further comprising the steps of:

identifying that the first instruction is an instant replay instruction;

storing a predetermined amount of the most recently acquired display data;

processing at least a portion of the stored predetermined amount of display data in a manner that enables the stored predetermined amount of display data to be displayed at a third rate; and after identification of the first instruction and before identification of the second instruction, performing the steps of:

transferring the processed, stored predetermined amount of display data, in the order that the processed, stored predetermined amount of display data was stored, to the display device; and displaying, at the third rate, an image generated from the processed, stored predetermined amount of display data transferred to the display device.

7. A system for displaying an image over a period of time, the image represented by an ordered set of display data, the system comprising:

means for acquiring display data from a data source;

means for displaying an image generated from display data;

means for transferring display data to the means for displaying;

means for storing acquired display data, the means for storing including multiple transducers that each enable data to be stored by, and/or accessed from, the means for storing;

means for identifying a first instruction from a user that either directly or indirectly specifies a pause in the display of the image;

means for identifying a second instruction from a user that either directly or indirectly specifies resumption of the display of the image;

means for controlling the transfer of the acquired display data to the means for displaying, the means for controlling further comprising means for processing stored display data, before and/or after the stored display data is stored, in a manner that enables the stored display data to be displayed at a second rate that is greater than a first rate, wherein:

if no first instruction is received from a user, the means for controlling causes the acquired display data to be immediately transferred to the means for displaying for generation of the image at the first rate;

when a first instruction is received from a user, the means for controlling causes the acquired display data to be stored in the means for storing rather than being transferred directly to the means for displaying;

when a second instruction is received from a user:

the means for controlling causes the processed stored display data to be transferred to the means for displaying, in the order that the stored display data was stored, for generation of the image at the second rate;

the means for controlling continues to cause the acquired display data to be stored in the means for storing, rather than being transferred directly to the means for displaying, so long as there is stored display data that has not yet been transferred to the means for displaying, the amount of stored display data being gradually reduced by display of the stored data at the second rate that is greater than the first rate at which the display data need be stored to enable display of the display data at the first rate; and when the storage of acquired display data stops after a second instruction has been received, the means for controlling again causes the acquired display data to be immediately transferred to the means for displaying.

8. A system as in claim 7, adapted for use with a data source that includes pre-recorded display data, such that next display data can be acquired at any time during the method, the next display data being display data that should be transferred to the display after the most recently transferred display data.

9. A system as in claim 7, adapted for use with a data source in which next display data is only momentarily available from the data source, the next display data being display data that should be transferred to the display after the most recently transferred display data.

10. A system as in claim 7, adapted for use with digital display data.

11. A system as in claim 7, adapted for use with analog display data.

12. A system as in claim 7, adapted for use with video display data.

13. A system as in claim 7, adapted for use with audio display data.

14. A system as in claim 7, wherein the means for storing further comprises first and second data storage mediums.

15. A system as in claim 7, wherein:

the first instruction is an instant replay instruction;

the means for storing is adapted to store a predetermined amount of the most recently acquired display data;

the means for controlling further comprises means for processing at least a portion of the stored predetermined amount of display data in a manner that enables the stored predetermined amount of display data to be displayed at a third rate;

the means for controlling is adapted to cause, after identification of the first instruction and before identification of the second instruction, the processed, stored predetermined amount of display data to be transferred, in the order that the processed, stored predetermined amount of display data was stored, to the means for displaying; and the means for displaying is adapted to display, at a third rate, an image generated from the processed, stored predetermined amount of display data transferred to the means for displaying.

16. A computer readable medium encoded with one or more computer programs for enabling display of an image over a period of time, the image represented by an ordered set of display data that, during normal operation of a display system, is used to generate an image at a first rate as the display data is acquired, comprising:

instructions for identifying a first instruction from a user that either directly or indirectly specifies a pause in the display of the image;

instructions for stopping, in response to the first instruction, the transfer of display data to the display device;

instructions for causing a data storage device to store the display data acquired subsequent to the first instruction;

instructions for identifying a second instruction from a user that either directly or indirectly specifies resumption of the display of the image;

instructions for causing, in response to the second instruction, the transfer of stored display data, in the order that the stored display data was stored, to the display device;

instructions for processing the stored display data, either before or after the stored display data is stored, in a manner that enables the stored display data to be displayed at a second rate that is greater than the first rate;

instructions for continuing to store display data acquired subsequent to identification of a second instruction, so long as there is stored display data that has not yet been transferred to the display device;

instructions for stopping, subsequent to identification of a second instruction, storage of acquired display data when the stored display data has all been transferred to the display device;

instructions for re-initiating the transfer, upon stopping storage of acquired display data, of display data to the display device as the display data is acquired so that the transferred display data can be used to generate an image at the first rate;

instructions for identifying a third instruction from a user that specifies the time at which the transfer of display data to the display device as the display data is acquired is to be re-initiated after specification of a second instruction; and instructions for calculating the second rate based upon the specified time, the time at which resumption of the display of the image begins, the amount of stored display data at the time at which resumption of the display of the image begins, and the first rate.

17. A computer readable medium as in claim 16, further comprising:

instructions for identifying that the first instruction is an instant replay instruction;

instructions for storing a predetermined amount of the most recently acquired display data;

instructions for processing at least a portion of the stored predetermined amount of display data in a manner that enables the stored predetermined amount of display data to be displayed at a third rate;

instructions for transferring the processed, stored predetermined amount of display data, in the order that the processed, stored predetermined amount of display data was stored, to the display device after identification of the first instruction and before identification of the second instruction; and instructions for displaying, at the third rate, an image generated from the processed, stored predetermined amount of display data transferred to the display device.

18. A system as in claim 14, wherein the means for controlling causes display data to be stored on one of the first and second data storage mediums when display data is being transferred to the means for displaying from the other of the first and second data storage mediums.

19. A system as in claim 7, wherein the means for storing further comprises a data storage medium having associated therewith multiple transducing heads.

20. A system as in claim 7, wherein the means for storing further comprises a disk-array hard disk system including multiple disks, each of which have a transducing head associated therewith.

* * * * *